(12) United States Patent
Liao

(10) Patent No.: US 8,400,879 B2
(45) Date of Patent: Mar. 19, 2013

(54) SEISMIC SENSOR ARRAY DEVICES AND METHODS OF DATA COLLECTION

(76) Inventor: Yi Liao, Santa Rosa, CA (US)

( * ) Notice: Subject to any disclaimer, the term of this patent is extended or adjusted under 35 U.S.C. 154(b) by 209 days.

(21) Appl. No.: 12/814,935

(22) Filed: Jun. 14, 2010

(65) Prior Publication Data

US 2011/0305112 A1    Dec. 15, 2011

(51) Int. Cl.
*G01V 1/16* (2006.01)
(52) U.S. Cl. ............... 367/177; 181/122; 181/404
(58) Field of Classification Search ............ 367/177, 367/178; 181/122, 401; 73/649
See application file for complete search history.

(56) References Cited

U.S. PATENT DOCUMENTS

| 4,300,220 | A | * | 11/1981 | Goff et al. ............... 367/188 |
| 4,398,276 | A | * | 8/1983 | Kruppenbach ............. 367/191 |
| 4,813,029 | A | * | 3/1989 | Erich et al. ............... 367/188 |
| 4,838,379 | A |   | 6/1989 | Maxwell |
| 5,010,531 | A | * | 4/1991 | McNeel ..................... 367/188 |
| 5,142,499 | A | * | 8/1992 | Fletcher ..................... 367/20 |
| 5,214,614 | A |   | 5/1993 | Baule |
| 5,315,074 | A |   | 5/1994 | Berquist |
| 5,335,208 | A |   | 8/1994 | Sansone |
| 6,532,190 | B2 |  | 3/2003 | Bachrach |
| 6,814,160 | B1 |  | 11/2004 | Scott |
| 2005/0249039 | A1 | | 11/2005 | Miller et al. |

* cited by examiner

*Primary Examiner* — Ian Lobo (57) ABSTRACT

A sensor vehicle of the present invention has one or more rotatable track means (parallel if two or more) spaced apart by a support frame and adapted to be towed or otherwise moved in a forward direction parallel to a forward axis of said track means. Rotatable track means have two or more supporting wheels aligned on a vertical plane along the forward axis, which axis is generally parallel to a ground surface upon which said sensor vehicle travels. Tracked vehicles are well known in the art of ground and earth moving equipment having flexible, elastomer-based tracks or segmented metal tracks with associated support frames and wheels, most of which may be adapted to achieve the objects of the invention.

20 Claims, 11 Drawing Sheets

SEISMIC SENSOR ARRAY DEVICES AND METHODS OF DATA COLLECTION

FIELD OF THE INVENTION

The present invention relates to seismic sensor array devices and data acquisition methods and, more specifically, continuous land streamer seismic sensor arrays, real-time data acquisition devices, and the methods of seismic data collection.

BACKGROUND OF THE INVENTION

Subsurface seismic exploration is presently based on elastic wave test signals remotely detected by sensors (geophones) and evaluated using well known geophysical methods. Said test signals can be the result of surface of subsurface natural or artificial signal source (the source) generating elastic waves (seismic waves), where seismic waves travel through underground media and, by way of substantially unchanged wave travel or by way of reflection, refraction and other forms of wave changing travel, reach a receiving sensor array. A receiving sensor array comprises multiple seismic sensors regularly arranged and carefully located to optimally detect original or changed seismic waves and to transduce sensed elastic waves into electrical signals for input by electrical connection with a signal acquisition system recording said transduced data through signal processing and analysis, to determine the geometry and physical characteristics of the subsurface.

Traditional seismic data acquisition is made by the well-known artificial plug detector method, whose efficiency is limited because of a requirement for multiple fixed placements and removals of sensors in an array. Quick deployment and use of a land geophone receiver array for the seismic exploration has been the subject of intense investigation and experimentation. Over the last decade, the United States National Science Foundation (NSF), Department of Energy (DOE), and the Department of Defense (DOD) have invested substantial amounts toward these and related subjects. PFM Manufacturing Company (Montana Tech and PFM Manufacturing) have developed under the U.S. National Science Foundation a set of marine seismic exploration buoys, a land-use zones sensor array (land streamer), and a four-sensor array with for land using multiple, parallel sets of said arrays.

It is known to use a vehicle to pull behind it an array of seismic sensors over the surface of the ground. However, there are severe limitations to the use of such systems. Each seismic sensor must be directed downward and, in use, be generally aligned normal to the curvature of the Earth at the point of contact. It is an inherent requirement of seismic sensors that they not only be in contact with the Earth but are preferably inserted into it to improve seismic wave detection. The pull-behind seismic sensor array systems are inherently barred from using seismic sensors which are insertable into the surface. The underside of each such geophone must be sufficiently smooth so that it can be easily dragged forward by a vehicle without deflection. Even a small amount of deflection of a detecting geophone causes collected data to be essentially worthless. Thus, such pull-behind systems are of little value unless the entire intended path of the pulled array is smoothed almost to the point of forming a road surface. A desired set of surfaces for application of an array of geophones may be located in an area where such smoothing is impractical or not economical or where insertable geophone housings may be required for effective wave detection. There is a need for a geophone array system which overcomes the limitations of the pull-behind systems while preserving their advantages.

The surfaces upon which the pull-behind system can be practiced are very limited. University of Kansas and the United States for nearly 10 years studied small 3D-array detector devices. U.S. Pat. No. 6,532,190 for a seismic sensor array discloses multiple sensors implanted by way of hydraulic implantation in a detector array, but the seismic sensors each must be fixed in a rigid housing and driven into the ground requiring flat, rigid steel housings introducing wave interference which negatively affect measurement accuracy. In addition, Switzerland, ETH, Denmark COWI, Kansas Geological Survey, Ramboll Sweden and other companies have developed pull-behind systems based on towing sets of parallel cables to which seismic sensors have been fixed to an underside.

SUMMARY OF THE INVENTION

The invention is presented in the light of the shortcomings of existing technology, and its purpose is to provide a large area in the scope of testing for rapid measurements, achieved by very accurate measurement by one or more highly mobile and versatile sensor vehicles, each of which is adapted to use geophones capable of tight coupling with the ground for detection of seismic waves.

The present invention is to achieve the following technical solutions: seismic sensor array devices, including seismic sensors, acquisition card and computer, characterized by the fact that the array of devices before rolling through the track, as described with seismic sensors installed in the track, rolling on a road may constitute a continuous seismic sensor array.

The sensor vehicle of the present invention comprises one or more rotatable track means (parallel if two or more) spaced apart by a support frame and adapted to be towed or otherwise moved in a forward direction parallel to a forward axis of said track means. Rotatable track means comprise two or more supporting wheels aligned on a vertical plane along the forward axis, which axis is generally parallel to a ground surface upon which said sensor vehicle travels. Tracked vehicles are well known in the art of ground and earth moving equipment having flexible, elastomer-based tracks or segmented metal tracks with associated support frames and wheels, most of which may be adapted to achieve the objects of the invention.

Said rotatable track comprises two or more, preferably eight or more, or even more preferably forty or more, geophones fixed and arranged in a single vertical plane about said rotatable track in one or more such continuous track sets of geophones so that when it rotates a specific and pre-determined number of uniquely identified geophones shall contact the earth's surface along the ground contacting portion of the rotatable track. Each uniquely identified geophone located in the ground contacting portion of the rotatable track is capable of receiving seismic wave transference from the ground at a geographically predetermined location established for desired for reception of seismic waves. Those ground contacting geophones are electrically connected to an input/output unit which is connected to a microprocessor having memory and operating under a control program adapted to receive and store sensed seismic wave inputs from each ground contacting geophone and to store such inputs associated with a unique identifier and its specific geographical location. Said input/output unit further comprises inputs for a GPS unit for establishing a present geographical location and storing it in memory. Said control program is operated to receive inputs from specific geophones in ground contact and to transmit by wire or wirelessly stored inputs to remote microprocessor units capable of receiving, storing and/or using for calculation inputs from the ground contacting geophones.

Ground contacting sensors fixed to the rotatable track receive surface elastic wave signals, and transduce vibration signals into electrical signals. Said electrical signals are transmitted to an acquisition card (which may include said input/output unit and microprocessor) and then to signal cable connectors for delivery to a computer or sent to the earth motion logger records, or through wireless communications devices, wireless transmission of signals to a computer or referred to in records of the earthquake recorder. Described herein are seismic sensors fixed in said track which protrude beyond an outside surface of the rotatable track by way of a rigid metal or plastic touchdown shoe or housing of several configurations of for touchdown and impression into the earth's surface. Described herein are seismic sensors for single-component sensors, two-component sensor, three-component sensor or sensor component within a single touchdown shoe, where inclusion of multiple sensor units and/or components allows for detection of elastic waves to longitudinal waves, shear waves and surface waves.

Said touchdown shoes may have cylindrical shape, cone-shape, frustro-conical, triangular-shape structure, polyhedral conical, convex or convex-shaped spherical shape. The rotatable tracks may be a rubber crawler track, metal track or other materials with a continuous loop. Track means may comprise an oval track to track, triangular or polygonal track system tracks movement. Track means further comprise a sliding connector so that each uniquely identified geophone, sensor, or sensor component which rotates about a rotatable track is adapted connect with said input/output unit via the sliding connector for continuous electrical connection therewith. Said sliding connectors further are adapted to indicate a spatial location of each sensor or sensor component along the vertical plane intersecting a track set of geophones so that sensors in contact with the ground and those that are not may be determined.

When the wireless transmission is required, the above acquisition card is equipped with a wireless signal transmitter for bi-directional communication with a computer or an earthquake recorder equipped with a wireless signal receiver. A crawler-based wireless signal receiver can thereby receive sensor outputs through a signal transmission line to the computer or earthquake logger. Current geographical location may be determined in relation to the sensor at a ground surface by way of reference points from the array of devices to determine the current geographical coordinates. The present invention's devices use electrical power from battery, generator, or other power source.

Objectives of the present invention are to provide a seismic sensor array using the above sensor vehicle(s), including:
a, earthquake or earth motion sensed through sensors impressed into the earth by way of the ground contacting portion of said track for tight coupling with a detection surface;
b, a rolling, sensor-bearing rotatable track having the present seismic sensor array and adapted to be used along a straight, curved, or other variable path in contrast with prior art devices which must be dragged forward in a straight line along a smooth surface;
c, elastic wave signals are detected whereafter elastic wave signals are changed into corresponding electrical signals;
d, provision of current GPS coordinates to determine the seismic sensors location to detect surface relative to the coordinates of the location;
e, transmission of sensor output to a sliding connector or a wireless transmission connection to a remote transmitted signal recorder;
f, elastic wave detection signal is excited by artificial or natural excitation generated by the source; artificial excitation source can also be a movement in order to achieve continuous measurement campaign.

Described herein is a seismic sensor array that can be connected through the parallel combination of serial or parallel connections, the realization of an area array, in order to achieve three-dimensional seismic data acquisition.

The beneficial effects of this invention: the seismic sensors installed on a rotatable track, with the rolling track to achieve the seismic sensor array arrangement. Seismic sensor array rolling road, alternate contact surface detection, rapid measurement. Touchdown through the shoe sensor settings, so that the sensor to detect surface and more closely coupled to ensure the accuracy of the data collection. The cone-shaped touch sensor and shoes, track movements in the former wheel sensor buried in vertical compression, together with the track of the pressure sensor in order to achieve the tight coupling with the ground. Fixed in the track, the sensor coupled with the ground as the effect of compaction sensor interpolation. Tracked movements in the measurements can be achieved very rapid earthquake data collection. For mobile source and can be used in combination to form a continuous movement of the earthquake measuring system, can achieve the objectives of the investigation of high-speed scanning, greatly enhancing the detection efficiency.

The device through the serial connection can be achieved with a longer measurement; through the parallel connected combination of serial or parallel connections increases, portfolio size array can be achieved in order to complete the three-dimensional seismic surveys. The device can be adapted to the complexity of the ground, shallow water conditions and poor transfer of the regional areas of detection, are also applicable to the ground surface, buildings or other solid surface based on the detection of objects.

The basic application of this invention is the field of seismic and acoustic (ultrasonic) non-destructive testing, its scope of use extends from shallow surface detection, exploration of resources in the shallow to the deep exploration of oil and gas fields. Expansion of this invention can also be applied to shock the moon research on soil, rock structure on detection of movement of military vehicles and targeting groups, non-destructive detection of the project components, and the natural vibration of the source of microseismic detection, human sound waves to scan the areas of bone.

BRIEF DESCRIPTION OF THE DRAWINGS

FIG. 2-1 is a downward and cutaway view of a ground contacting portion of a rotatable track of the present invention supported between and rotatable about arranged between two track contacting wheels, where geophones of the present invention are fixed with a downward, outward directed touchdown shoe and are arranged in two parallel rows, one on each side of said wheels.

FIG. 2-2 is a downward and cutaway view of a ground contacting portion of a rotatable track of the present invention supported between and rotatable about arranged between four track contacting wheels, where geophones of the present invention are fixed with a downward, outward directed touchdown shoe and are arranged in one between aligned pairs of said wheels.

FIG. 2-3 is a downward and cutaway view of a ground contacting portion of a rotatable track of the present invention supported between and rotatable about arranged between three pairs of two aligned track contacting wheels, where geophones of the present invention are fixed with a downward, outward directed touchdown shoe and are arranged in two parallel rows, one on each side of a center pair of said wheels.

FIG. 3-1 is a side to side cross section diagram of a conical touchdown shoe embodiment of the invention showing a rotatable track and a geophone having a conical touchdown shoe fixed to the track and into which a sensor core is fixed to effect subsurface detection of seismic waves.

FIG. 3-2 is a side to side cross section diagram of a flat bottom touchdown shoe embodiment of the invention showing a rotatable track and a geophone having a flat bottom touchdown shoe fixed to the track and into which a sensor core is fixed to effect surface detection of seismic waves.

FIG. 4-1 is a side view of a diagram of the sensor vehicle of the invention showing a tracked embodiment using two major track contacting wheels for the rotatable track.

FIG. 4-2 is a side view of a diagram of the sensor vehicle of the invention showing a tracked embodiment using three major track contacting wheels for the rotatable track.

FIG. 4-3 is a side view of a diagram of the sensor vehicle of the invention showing a tracked embodiment using four major track contacting wheels for the rotatable track.

FIG. 5-1 is a side and cutaway view of a sliding electrical connection between geophones and electrical devices fixed to a support frame of the sensor vehicle of the invention.

FIG. 5-2 is a side and cutaway view of a sliding electrical connection between geophones and electrical devices fixed to a support frame of the sensor vehicle of the invention.

FIG. 6-1 is a high level block diagram representing a set of cable connections for a signal transmission structure of the invention.

FIG. 6-2 is a high level block diagram representing a set of cable connections for a signal transmission structure of the invention.

FIG. 6-3 is a high level block diagram representing a set of cable connections for a signal transmission structure of the invention.

FIG. 7-1 is a high level block diagram representing a system of wireless signal transmission devices for wireless transmission of signals to and from the sensor vehicle of the invention.

FIG. 7-2 is a high level block diagram representing a system of wireless signal transmission devices for wireless transmission of signals to and from the sensor vehicle of the invention.

FIG. 7-3 is a high level block diagram representing a system of wireless signal transmission devices for wireless transmission of signals to and from the sensor vehicle of the invention.

FIG. 8-1 is a side to side cross section diagram of a conical touchdown shoe embodiment of the invention showing a rotatable track, dual supporting wheels, and a geophone having a conical touchdown shoe fixed to the track and into which a sensor core is fixed to effect subsurface detection of seismic waves.

FIG. 8-2 is a side to side cross section diagram of a flat bottom touchdown shoe embodiment of the invention showing a rotatable track, dual supporting wheels, and a geophone having a flat bottom touchdown shoe fixed to the track and into which a sensor core is fixed to effect surface detection of seismic waves.

FIG. 8-3 is a side to side cross section diagram of a frustro-conical touchdown shoe embodiment of the invention showing a rotatable track, dual supporting wheels, and a geophone having a frustro-conical touchdown shoe fixed to the track and into which a sensor core is fixed to effect subsurface detection of seismic waves.

FIG. 8-4 is a side to side cross section diagram of a rounded or hemispheric bottom touchdown shoe embodiment of the invention showing a rotatable track, dual supporting wheels, and a geophone having a rounded or hemispheric touchdown shoe fixed to the track and into which a sensor core is fixed to effect subsurface detection of seismic waves.

FIG. 9-1 is a top view of a diagram of a towing vehicle towing across an earthen surface a single sensor vehicle according to the invention.

FIG. 9-2 is a top view of a diagram of a towing vehicle towing across an earthen surface a serial set of six or more sensor vehicles according to the invention.

FIG. 9-3 is a top view of a diagram of a towing vehicle towing across an earthen surface a parallel set of four or more sensor vehicle according to the invention.

FIG. 9-4 is a top view of a diagram of a towing vehicle towing across an earthen surface a set of sensor vehicles as in FIG. 9-2 arranged in four or more parallel series as in FIG. 9-3.

FIG. 9-5 is a top view of a diagram of multiple serial towing vehicles each towing across an earthen surface a set of sensor vehicles as in FIG. 9-2.

FIG. 9-6 is a top view of a diagram of multiple parallel towing vehicles each towing across an earthen surface a set of sensor vehicles as in FIG. 9-2.

FIG. 9-7 is a top view of a diagram of multiple rows of serial parallel towing vehicles each towing across an earthen surface a set of sensor vehicles as in FIG. 9-5.

DETAILED DESCRIPTION OF THE INVENTION

The invention shall now be discussed with reference to the figures.

Figure 1:
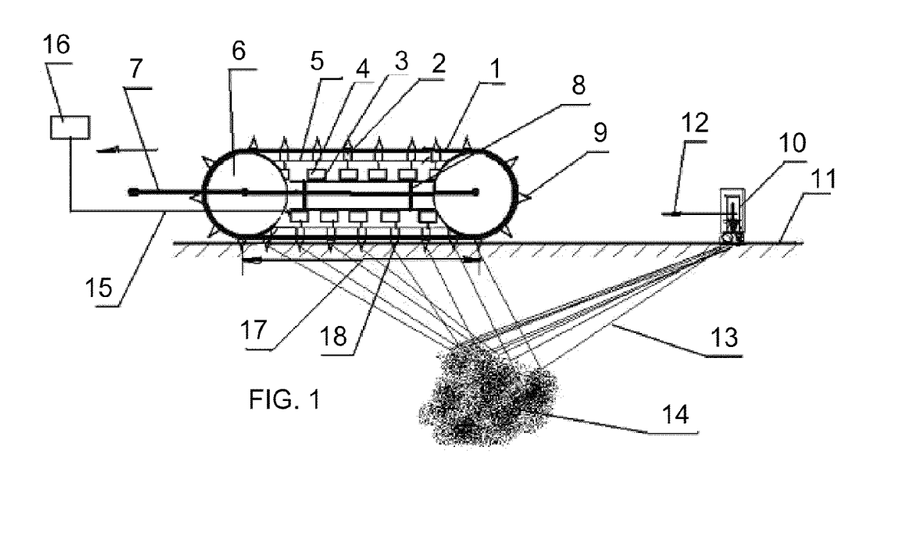
FIG. 1 is a side view of a diagram of the sensor vehicle of the invention showing a support frame for two of four track contacting wheels engaging one of two or more rotatable tracks, where geophones each having a conical touchdown shoe are fixed in said track so that they are outwardly directed and so that they will pierce the surface of the earth upon which the sensor vehicle travels forward or backward.

Item numbering: 1, Track; 2, seismic sensors; 3, sliding connector; 4, collecting cards; 5, the sensor connection; 6, track support wheel; 7, drag the bar; 8, stent; 9, touchdown shoes; 10, the source; 11, face detection; 12, drag the source; 13, an earthquake-ray; 14, to detect targets; 15, Tai-ray equipment; 16, an earthquake recorder or computer; 17, touchdown sensor array; 18, touch to sensor; 19, supported round rail track; 20, sensor core; 21, the sensor connection seals; 22, sensor jacket; 23, the sensor cover; 24, towing aircraft; 25, trailer; 26, GPS receiving system; 27, tracked the reference point coordinates; 28, axial core position; 29, an earthquake sensor ID number; 30, a conductor film; 31, sliding brush conductor; 32, sliding bar; 33, fixation The following combination of this invention is described in further detail. The invention of seismic sensor array devices, including seismic sensors 2, 4 and seismic acquisition card recorder or computer 16, the array device 1 through the track before rolling. 2 with seismic sensors and a fixed track, the seismic sensor array constituted. 2 seismic sensors in the front-end protruding peripheral track 1, set up his touchdown shoes 9, as shown in FIG. 1. Shoes 9 touchdown for the cylindrical shape, cone-shaped, triangular-shaped structure, Polyhedrosis conical, convex or convex-shaped spherical Taiwan.

Seismic sensors 2 sensors as a single component, two-component sensor, three-component sensor or sensor component; its acquisition of seismic waves as a longitudinal wave, shear wave and surface wave. 1 for the rubber crawler track, metal track or other materials with the composition of continuous oval, triangular or polygonal systems track movement. Seismic sensor array device 2 through the mechanical power source, electric power source or power source, such as artificial sources of power in the detection of surface drag on the movement of 11, detection means 11 is the ground surface, surface of the moon, building the basis of surface or other solid surface detection.

When the signal transmission cable, slide the connector 3 and 2 correspond to seismic sensors connected. Slide the connector 3 by the conductors and the fixed conductor movement of the fixed conductor movement in a medial track its movement with the track 1. Fixed conductor fixed bracket 8 on the track. Sliding contact between the two, the realization of signal connections. When the wireless transmission signal, the acquisition card equipped with 4 wireless signal transmitter, computer or seismic recorder equipped with a wireless signal receiver 16, or the signal sent to the installation of the bracket 8 on the wireless signal receiver, and then the signal through the signal transmission line to a computer or an earthquake recorder 16.

The present invention method of data collection:
a, earthquake sensors through its two touchdown shoes pressed 9 and the role of track 1 to 11, with close coupling face detection;
b, with a rolling track, seismic sensor array 17, before rolling, alternate contact detection surface 11, the realization of the entire seismic line measurement;
c, by the GPS system 26 to provide the current coordinates, and thereby determine the coordinates of the location of 18 seismic sensors;
d, followed by the receiving surface 11 to detect signals of seismic waves and seismic wave signals into corresponding electrical signals;
e, through the sliding connector 3 or wireless connection to the corresponding transmitted signal recorder and recorded.

Seismic sensor array through serial connection, the sensor array composed of more to achieve in the detection region with the largest measuring longitudinal line or through the parallel connected combination of serial or parallel connections increases, the realization of an area array, in order to achieve Three-dimensional seismic data acquisition, including seismic sensors to detect surface relative to the location of reference points from the array of devices to determine the current coordinates.

As shown in FIG. 1, when the impact of mobile source 10 to detect seismic waves generated surface 11, through the underground seismic signal, the transmission, reflection, refraction, scattering, etc., to bring the underground target 14 of the abnormal signal to return to the ground, from track 1 and the detection part of the contact surface 11 of the touchdown with 17 seismic sensors in the touch sensor 18, the receiving surface of the seismic wave signals, and the vibration signals into electrical signals, and then sliding through the acquisition card and the signal cable connector to the computer or seismic recorder 16 records, or through wireless communications devices, wireless transmission of signals to the computer or the earthquake described in logger 16 records.

Figure 21:
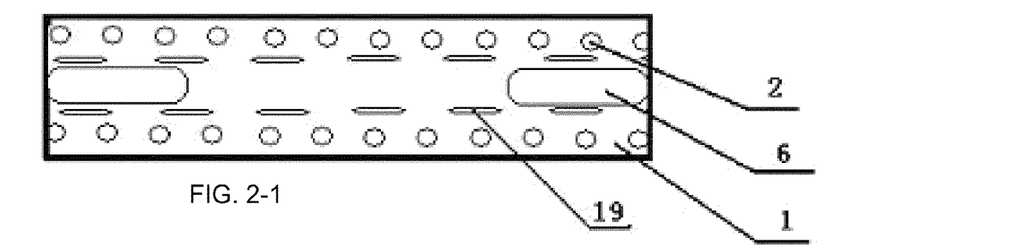
Figure 22:
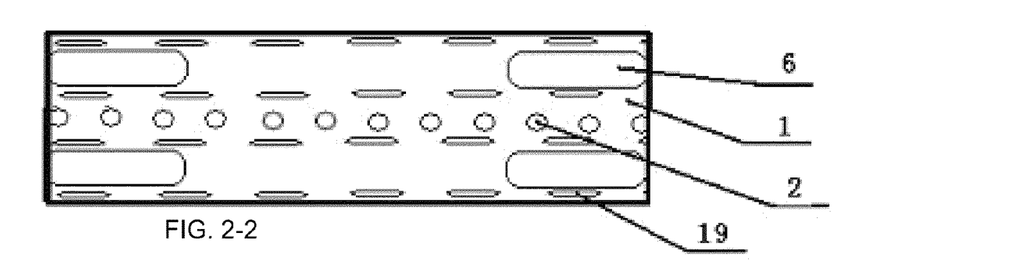
Figure 23:
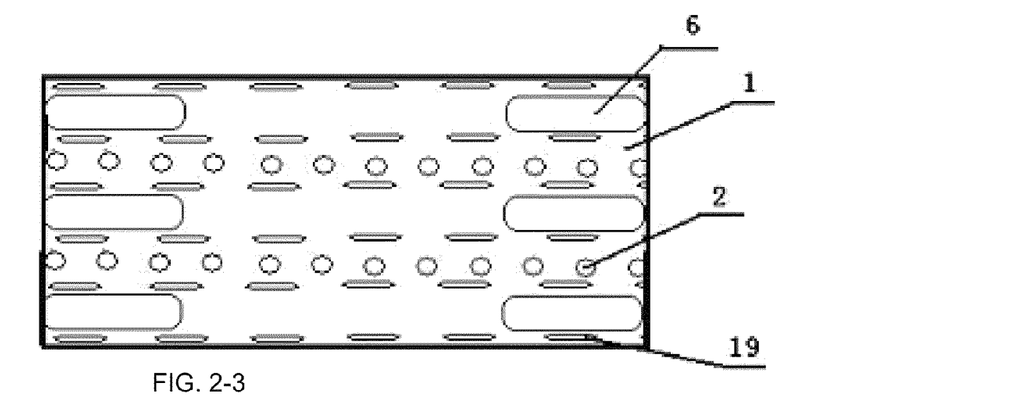

FIG. 2 for the sensor in the wheel tracks of the three forms of layout: FIG. 2-1 for the single-row tension-round, double-sensor array; FIG. 2-2 for the double tensioning wheel, single-row sensor array, arranged in such with exercise wheel, dual wheel can support more effective seismic sensor cone pressed into the ground; FIG. 2-3 Tension round three-row, double-sensor array with sensors on both sides of this round of tension sensor can effectively cone pressed into the ground.

Figure 31:
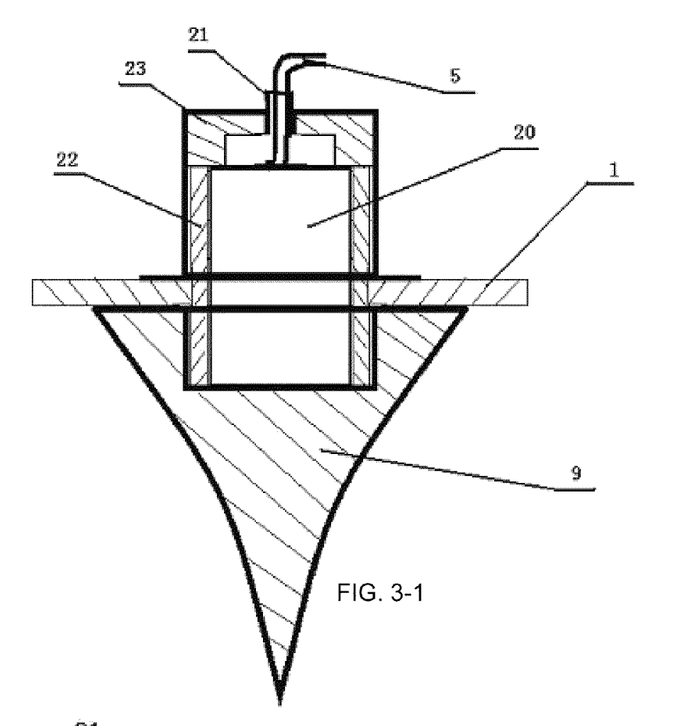
Figure 32:
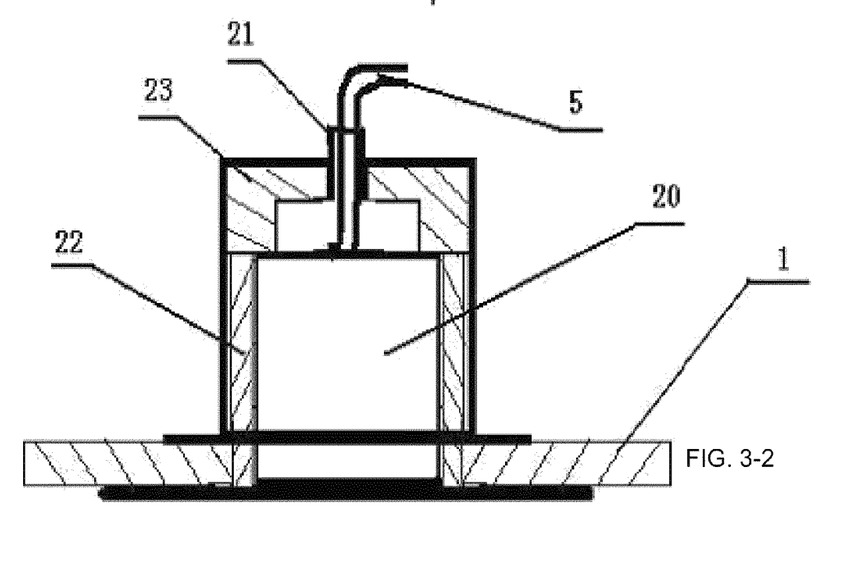

FIGS. 3-1, 3-2 track for the sensor in the assembly diagram, the sensor core 20 is packaged in a track 1, the sensor core 20, the external jacket 22 for the sensor, the sensor cover 23. Line sensor 5 by an inside track to bring out the line sensor 5 located sensors 21 seals the connection. FIG. 3-1 seismic sensor assembly 5 protruding in the lateral part of the track set up touchdown shoes 9.

Figure 41:
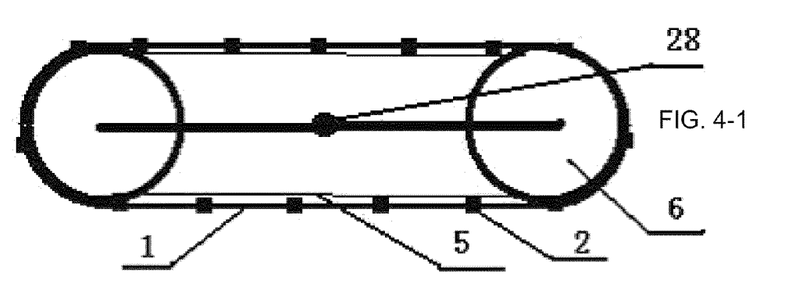
Figure 42:
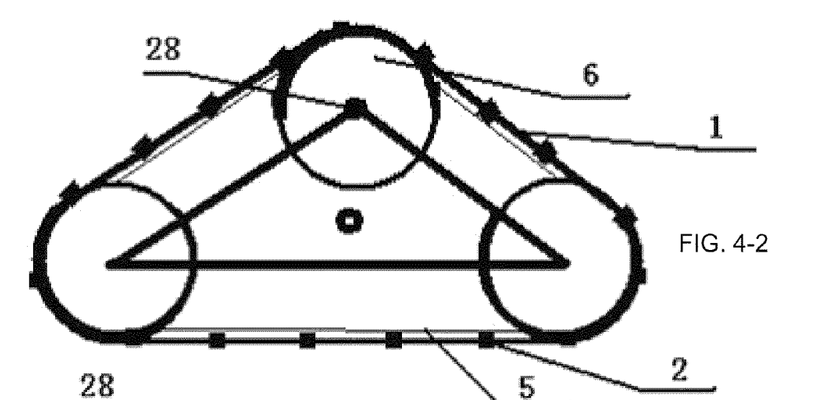
Figure 43:
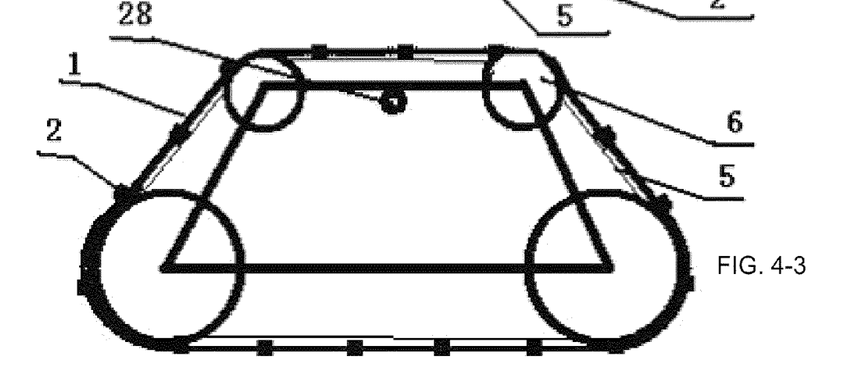
Figure 51:
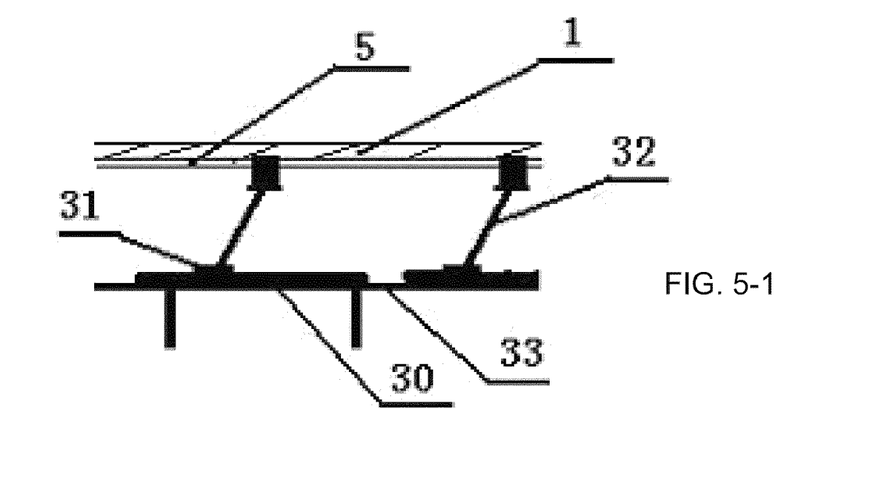
Figure 52:
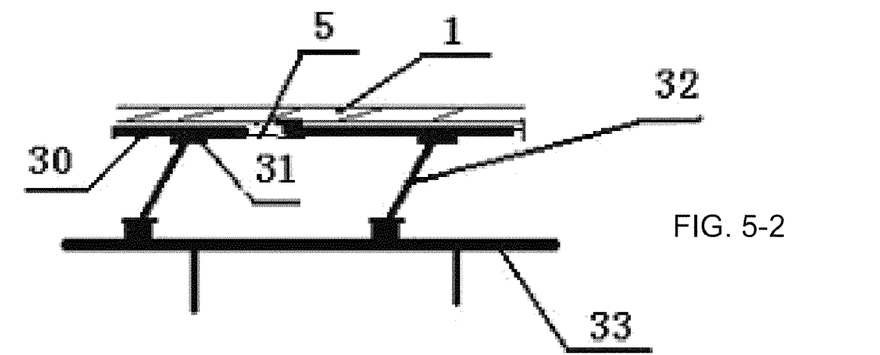
Figure 61:
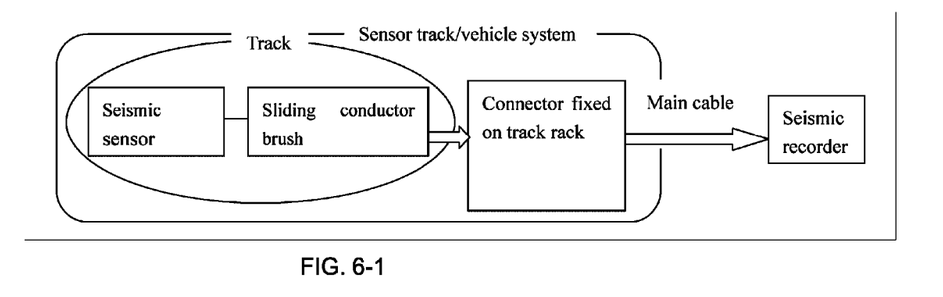
Figure 62:
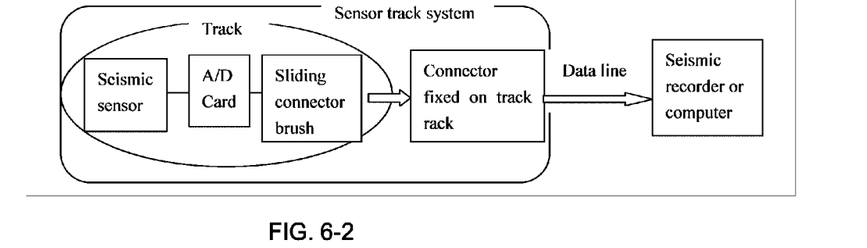
Figure 63:
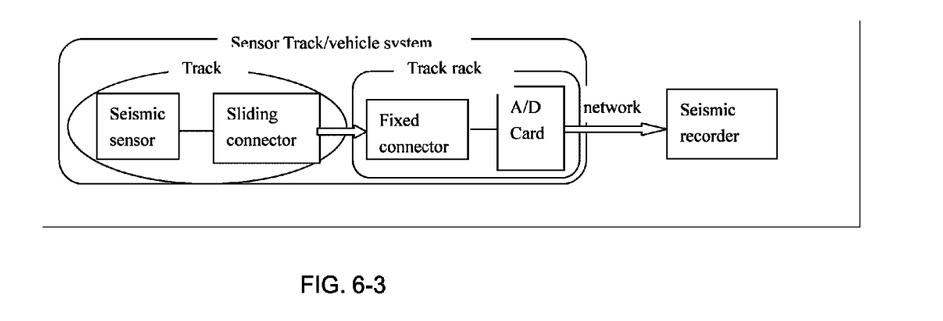

FIG. 2 shows the 4-1, 4-2, and 4-3, and several rounds of three teams from track structure diagram, two touchdown sensor track system with a relatively long length, and several rounds of three-axis tracked system 28 higher core position can be a direct replacement for military vehicles round, suitable for movement of vehicles targeted by seismic sensors, or the installation of the moon in the parade car, on the realization of the parade on Zhen Zhen sensor detection.

FIG. 5-1, 5-2 to set up two kinds of sliding connector diagram technical program, which was set up as shown in FIG. 5-1 in the movement track conductor 1 by the sliding rod 32 and 31 constitute a sliding brush conductor, conductor chip 30 fixed on the bracket 8, the sliding brush conductor 31 and conductor film 30, the sliding connection, will be track 1 on the corresponding sensor signal came, the realization of the sensor 2 and the cable connecting apparatus 16. The structure shown in FIG. 5-2 On the contrary, conductor film 30 as a movement, fixed on the track 1, track 1 with the movement. Sliding bar 32 and sliding brush 31 fixed conductor 8 in the stent, the sliding brush conductor 31 and conductor film 30, the sliding connection, the realization of the sensor 2 and the earthquake recorder or computer to connect the cable 16. 6-1, 6-2, 6-3 map shows the block diagram of signal transmission cable, which FIG. 6-1 to connect to traditional seismograph diagram: seismic sensors 18 to receive the signal through the detector line and connectors 3 connected to the Line 15 large instruments, and equipment connected to 15 major lines of 16 seismograph records; FIG. 6-2 to connect to the network diagram of apparatus: seismic sensors 18 to receive the signal from the setting in the track on the acquisition card into digital signal, data signals through the connector 3 and the digital communication network equipment lines, and digital seismic recorder or computer 16, communications and digital recording; FIG. 6-3 to connect to the network diagram of apparatus: seismic sensors 18 to receive the signal through the detector line and connectors 3 connected to the set of scaffolds in the track acquisition card 4, by the acquisition card into digital signals, data signals from the digital communication network equipment lines, and digital seismic recorder or computer 16, communications and digital recording.

Figure 71:
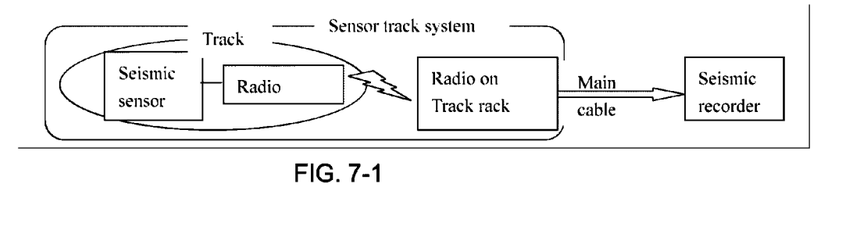
Figure 72:
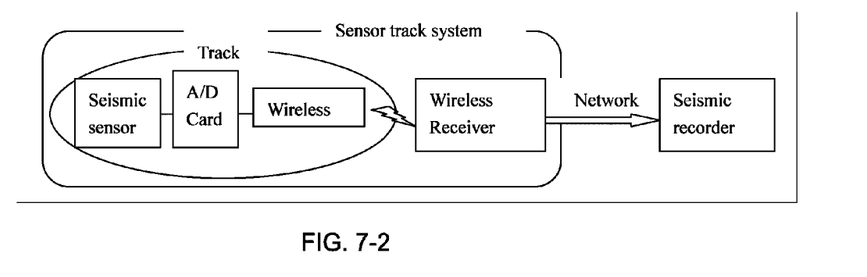
Figure 73:
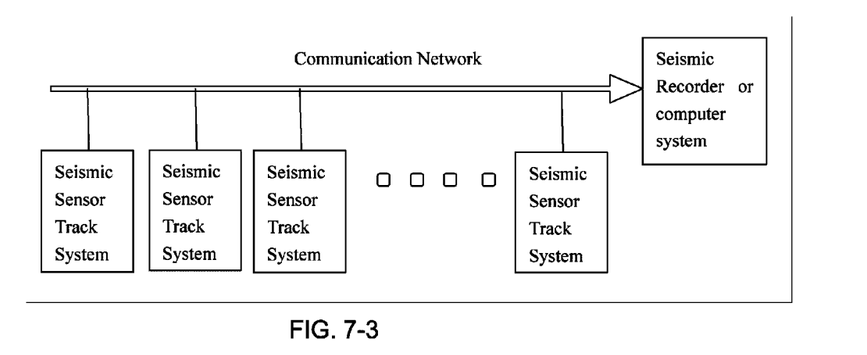
Figure 81:
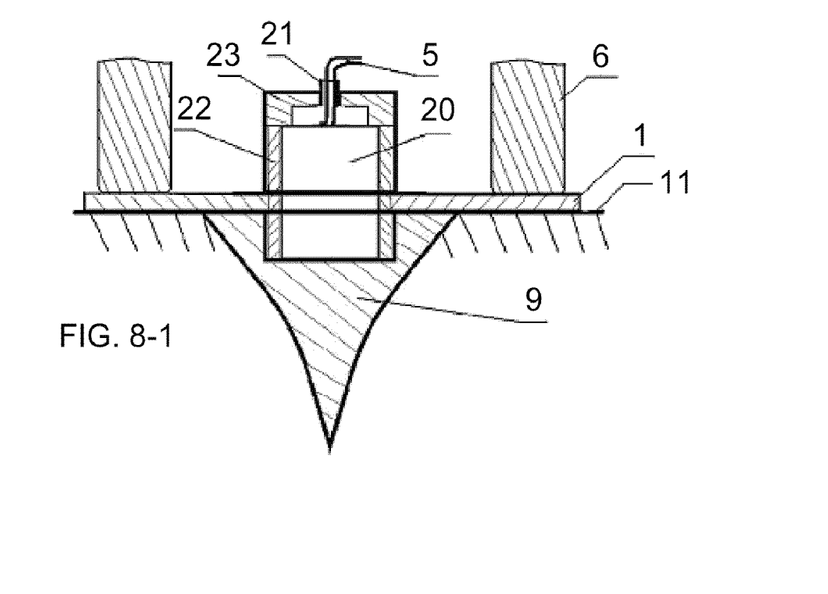
Figure 82:
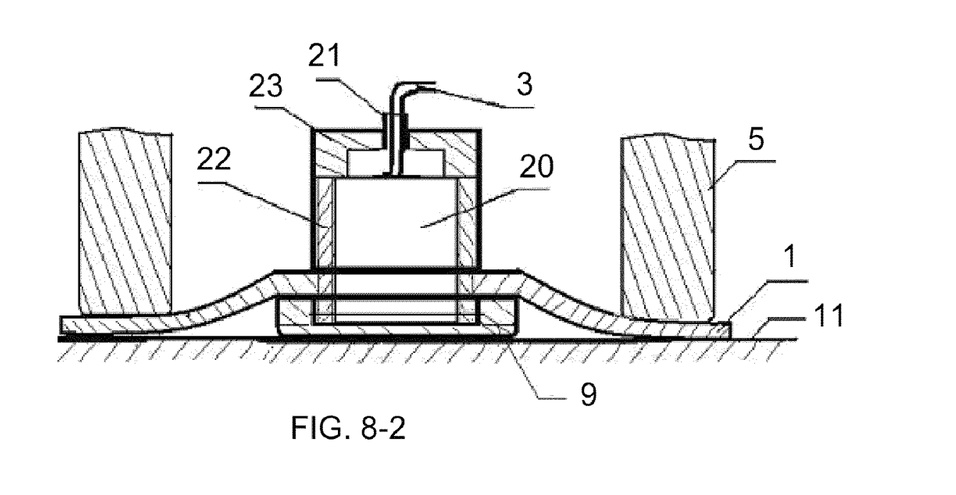
Figure 83:
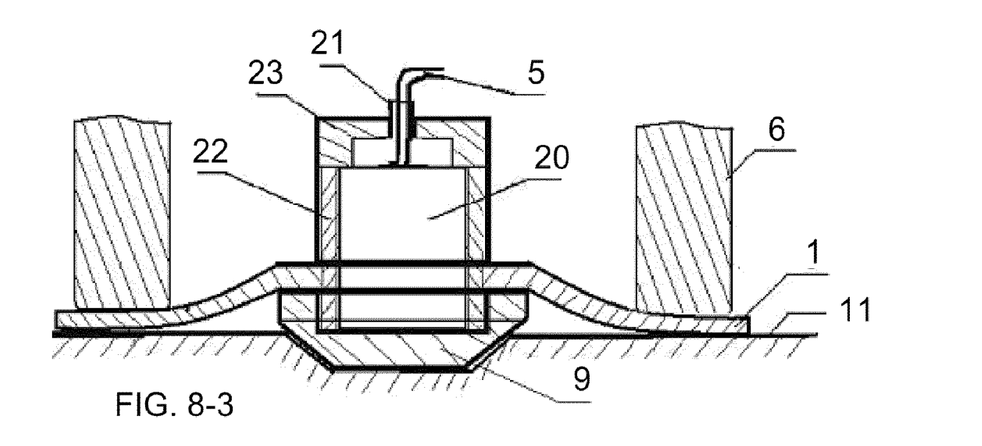
Figure 84:
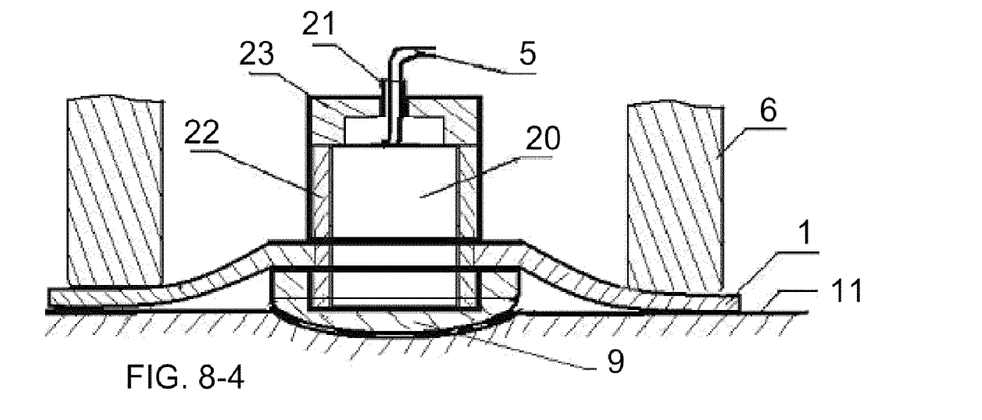
Figures 91, 92, 93:
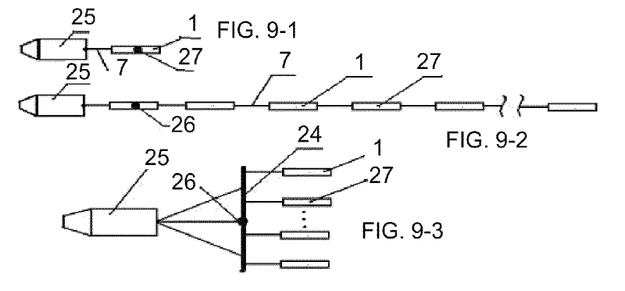
Figure 94:
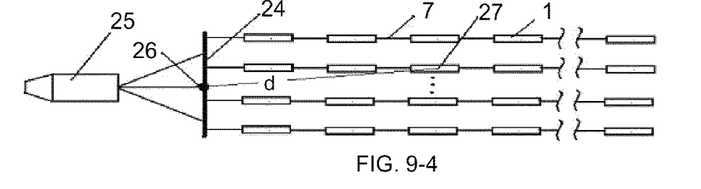
Figures 95, 96:
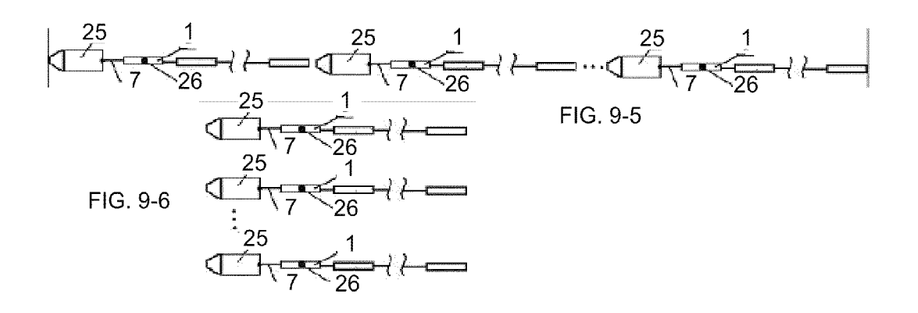
Figure 97:
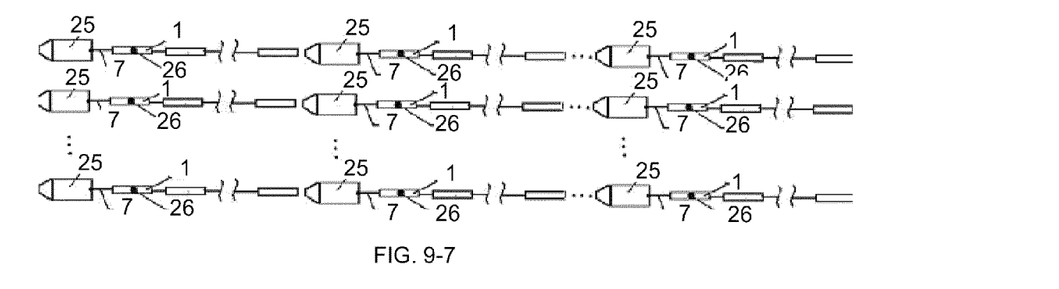

FIGS. 7-1, 7-2, and 7-3 show the block diagram of a wireless signal transmission, in which FIG. 7-1 Connection diagram for wireless sensors: seismic sensors 18 to receive the signal through a wireless signal transmitting and receiving equipment connected to the large line 15, Line 15 by the apparatus connected to the seismograph recorded 16; FIG.

7-2 to connect to a wireless network diagram of apparatus: seismic sensors receive the signal 18, set in the Track 1 from the acquisition card 4 into a digital signal, data signals transmitted through wireless links wireless tracked stent receiver via communication cable, and digital seismic recorder or computer communications and digital recording; FIG. 7-3 for the instrumentation network connection diagram: Tracked by the above-mentioned Acquisition of seismic sensor system through the communication network signal and digital seismic recorder or computer communications, by bicycle or seismic recorder digital recording computer, or transmitted through the relay on the computer records of a seismograph. Equipment to connect large networks are usually formed by the three-tier communication, the first-class communications to be tracked on the sensor signal reached the stent on the track network connection, communication distance of 10 meters or less; the second-class communications seismic sensor system will track the signal mass to set up a bicycle in a trailer on the seismograph or computer, communication distance up to several hundred meters; the third-class cycling from a computer or communications relay station seismograph network or wireless communication between computers, communication distance up to 1000 meters. First, the two communications can be wireless or wired communications. Bicycle computer storage of seismic data alone, can save between field seismic acquisition equipment vehicle data. Seismic sensor system in the track set up seismic data memory can also be tracked sensor systems eliminate the second-class collection of seismic data signals. Shape is shown in FIG. 8 four touchdown shoes coupled with the detection surface, of which FIG. 8-1 touchdown for the cone-shaped shoes, FIG. 8-2 for the cylindrical touchdown shoes, FIG. 8-3 for the touchdown-shaped boss shoes FIG. 8-4 spherical convex touchdown for shoes; cone touchdown loose shoes for face detection, for different levels of detection of loose surface of the cone can choose different length; Boss or convex-shaped spherical shoe sensor detection can be used in hard surface, sensor shoes protruding length and sharpness can be determined to detect surface texture; hard to detect the face, such as the cement surface, the use of cylindrical pillar sensors or low shoes.

Figure 10:
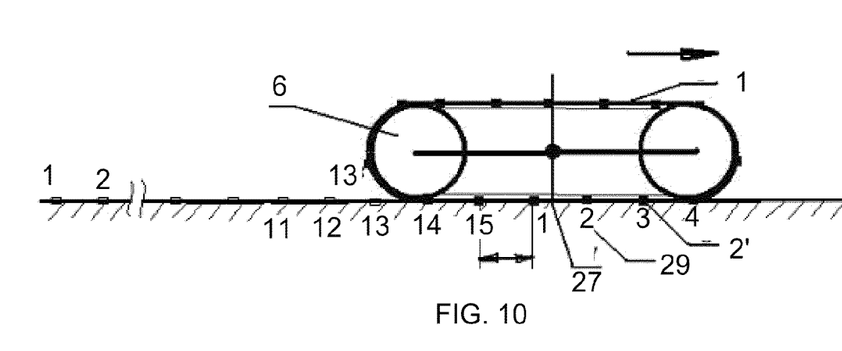
FIG. 10 is a diagram of a side view of the sensor vehicle of the invention traveling in a forward direction and showing geophone shoe touchdown locations for geophones fixed to at rotatable track of the sensor vehicle.

As shown in FIG. 9 of the vehicle towing the way; by the vertical line with two-dimensional seismic survey to be completed, covering an area with three-dimensional seismic survey to be completed. Single-track cycling seismic sensor array installation available 9-1 human, or a small electric car drivers, the general structure for engineering testing, shallow two-dimensional seismic exploration project; cycling track and more devices in parallel seismic sensor array FIG. 9-3 available manpower, or a small electric car drivers, for engineering the structure of shallow three-dimensional seismic exploration project; cycling track seismic sensor array and more devices can be used in tandem FIG. 9-2, the shallow geological, engineering and mineral resources of two-dimensional seismic exploration; cycling track seismic sensor array and more devices in series increase in parallel can be used in FIG. 9-4, the shallow geological, engineering and three-dimensional seismic exploration of mineral resources; multi-car series vertical line chart 9-5, in which each bicycle drag Tandem or multi-track series increase in parallel, for the completion of, the underlying geology, mineral resources and oil and gas fields or two-dimensional vertical line vertical line broadband seismic exploration; area parallel array multi-vehicle system plans and multi-car shunt 9-6 increase the area of tandem arrays FIG. 9-7, to complete, the deep geology, mineral resources and oil and gas fields of three-dimensional seismic exploration; Sensor location as shown in FIG. 10 to determine the way the current coordinate diagram. Calculated by the GPS positioning system 27 tracks the current reference point coordinates, and then by the touch sensor corresponding to the ID number 29 and the sliding time to determine the coordinates of the location of sensors; On the other hand, two adjacent distance between the seismic sensor spacing for the Road by seismic sensors tracked the corresponding ID number 29 and a turning circle track the number of sensors to determine the relative position from the measuring point.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A sensor vehicle having multiple seismic sensors effectively in contact with a ground surface for detection of seismic waves comprising:
   (a) one or more continuous rotatable tracks having a first width and adapted to rotate about supporting wheels for travel over said ground surface, which supporting wheels are in turn supported for rotation from a support frame, wherein a ground contacting portion of each rotatable track is in contact with said ground surface at rest or in travel; and
   (b) one or more of said seismic sensors or sensor components fixed within a housing comprising a touchdown shoe to form a sensor unit, where two or more sensor units are fixed to said rotatable track and are adapted to have said touchdown shoe directed generally normal to an outside surface of said rotatable track.

2. The vehicle of claim 1 wherein each sensor is electrically or wirelessly connected to recording means remote to the sensor units.

3. The vehicle of claim 2 wherein said electrical connection is by way of sliding contact means having a sliding electrical contact whereby a spatial location of each sensor unit is determinable in relation to said ground surface so that sensor units in contact with the ground surface and those that are not may be determined by inputs to a microprocessor with a memory operating under a control program.

4. The vehicle of claim 2 wherein recording means comprise to a microprocessor with a memory operating under a control program and each sensor is uniquely identified so that its sensed wave output is received by said microprocessor and associated with a unique identifier with a specific geographical location and a determination whether a sensor unit housing the sensor is in contact with the ground.

5. The vehicle of claim 4 wherein said microprocessor is adapted to, by wired electrical connection or by wireless communication, communicate sensor sensed output to a remote correspondent which may be another computer or recording means.

6. The vehicle of claim 2 wherein each rotatable track defines a forward or rearward direction of travel, wherein multiple sensor units are located in a track set along the rotatable track intersecting a substantially vertical plane to said direction of travel.

7. The vehicle of claim 6 wherein each rotatable track comprises one or two track sets.

8. The vehicle of claim 1 wherein said support frame comprises means for towing by a motorized vehicle.

9. The vehicle of claim 8 wherein two or more sensor vehicles are connected serially together with a lead vehicle connected with said motorized vehicle.

10. The vehicle of claim 8 wherein two or more sensor vehicles are adapted to be towed in parallel to each other by said motorized vehicle.

11. The vehicle of claim 9 wherein two or more serial sets of sensor vehicles are adapted to be towed in parallel to each other by said motorized vehicle.

12. The vehicle of claim 1 wherein one or more touchdown shoes are conical and are adapted to be impressed into the ground surface at a ground contacting portion of the rotatable track.

13. The vehicle of claim 1 wherein one or more touchdown shoes are frustro-conical and are adapted to be impressed into the ground surface at a ground contacting portion of the rotatable track.

14. The vehicle of claim 1 wherein one or more touchdown shoes are adapted to be impressed into the ground surface at a ground contacting portion of the rotatable track.

15. The vehicle of claim 1 wherein one or more touchdown shoes are flattened and adapted not to be impressed into the ground surface at a ground contacting portion of the rotatable track.

16. The vehicle of claim 1 wherein each sensor unit contains only a single-component sensor, a two-component sensor, or a three-component sensor.

17. The vehicle of claim 1 wherein each sensor is electrically or wirelessly connected to recording means remote to the sensor units and one or more sensor units comprise means for detecting longitudinal seismic waves, shear seismic waves and surface seismic waves.

18. The vehicle of claim 17 wherein said recording means comprise inputs from a geographical positioning system to be associated with inputs from said sensors fixed in sensor units fixed at a ground contacting portion of the rotatable track.

19. The vehicle of claim 1 wherein the rotatable track is elastomer based.

20. The vehicle of claim 1 wherein the rotatable track is comprised of interlocking sections.

* * * * *